(12) United States Patent
Gebhart et al.

(10) Patent No.: US 9,251,483 B2
(45) Date of Patent: *Feb. 2, 2016

(54) PERFORMANCE OPTIMIZATION OF BUSINESS PROCESSES BY STOCHASTIC ENVIRONMENTAL CHANGES

(71) Applicant: SAP AG, Walldorf (DE)

(72) Inventors: Alexander Gebhart, Ubstadt-Weiher (DE); Erol Bozak, St. Leon-Rot (DE)

(73) Assignee: SAP SE, Walldorf (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/108,775

(22) Filed: Dec. 17, 2013

(65) Prior Publication Data

US 2014/0122138 A1    May 1, 2014

Related U.S. Application Data

(62) Division of application No. 12/037,896, filed on Feb. 26, 2008, now Pat. No. 8,635,308.

(51) Int. Cl.

| *G06Q 10/06* | (2012.01) |
|---|---|
| *G06F 9/50* | (2006.01) |
| *G06F 15/16* | (2006.01) |
| *G06F 15/177* | (2006.01) |
| *G06F 15/173* | (2006.01) |
| *G06F 11/00* | (2006.01) |
| *G06F 9/46* | (2006.01) |
| *G06Q 10/00* | (2012.01) |
| *G06Q 90/00* | (2006.01) |

(52) U.S. Cl.
CPC ............... *G06Q 10/063* (2013.01); *G06F 9/50* (2013.01)

(58) Field of Classification Search
CPC ....... G06Q 10/04; G06Q 10/06; G06Q 10/10; G06Q 10/063; G06F 9/4856; G06F 9/50
USPC ............... 709/201, 220, 223; 714/1; 718/105; 705/1.1, 500
See application file for complete search history.

(56) References Cited

U.S. PATENT DOCUMENTS

| 7,372,952 B1 | 5/2008 | Wu et al. |
|---|---|---|
| 7,864,203 B1 | 1/2011 | Fear et al. |
| 8,635,308 B2* | 1/2014 | Gebhart ............... G06Q 10/063 705/1.1 |
| 2005/0044197 A1* | 2/2005 | Lai .................. G06Q 10/10 709/223 |
| 2005/0044301 A1 | 2/2005 | Vasilevsky et al. |

(Continued)

FOREIGN PATENT DOCUMENTS

| GB | 2 419 702 A | 10/2004 |
|---|---|---|
| GS | 2 419 697 A | 10/2004 |

*Primary Examiner* — Emmanuel L Moise
*Assistant Examiner* — Vitali Korobov
(74) *Attorney, Agent, or Firm* — Mintz Levin Cohn Ferris Glovsky and Popeo, P.C.

(57) ABSTRACT

Methods and apparatus, including computer program products, are provided for optimizing applications, such as applications included in a business process. In one aspect, there is provided a computer-implemented method. The method may include receiving information representative of one or more interfaces and aspects of each of the interfaces. The interfaces may be adjustable by a business process supervisor. The business process supervisor may adjust one or more aspects of the one or more interfaces. The results of the adjustment may be received and used to determine optimum settings to the one or more interfaces. Related apparatus, systems, methods, and articles are also described.

9 Claims, 3 Drawing Sheets

(56) References Cited

U.S. PATENT DOCUMENTS

| | | | |
|---|---|---|---|
| 2005/0120160 A1 | 6/2005 | Plouffe et al. | |
| 2006/0248177 A1* | 11/2006 | Dostert | G06F 11/3476 709/223 |
| 2007/0078988 A1* | 4/2007 | Miloushev | G06F 9/485 709/227 |
| 2008/0253542 A1* | 10/2008 | Lee | G06Q 10/10 379/201.03 |
| 2009/0106571 A1* | 4/2009 | Low | G06F 9/4856 713/310 |
| 2009/0241108 A1 | 9/2009 | Edwards et al. | |
| 2009/0276771 A1* | 11/2009 | Nickolov | G06F 9/4856 717/177 |
| 2009/0300605 A1 | 12/2009 | Edwards et al. | |

\* cited by examiner

PERFORMANCE OPTIMIZATION OF
BUSINESS PROCESSES BY STOCHASTIC
ENVIRONMENTAL CHANGES

CROSS-REFERENCE TO RELATED
APPLICATION

This application is a Divisional of U.S. patent application Ser. No. 12/037,896, filed on Feb. 26, 2008, the content of which is hereby incorporated by reference in its entirety.

FIELD

The present disclosure generally relates to optimizing systems implementing virtualization technology.

BACKGROUND

Computers have now become an integral part of our society both in business and in residential settings. Almost every business of sufficient size in Germany, the United States, and other developed countries has one or more computers to assist them in running their businesses. Similarly, many families in those countries now have computers at home that are used to run various applications, including games.

Some attribute the popularity of computers to the Internet. The Internet provides people with a ready access to vast amounts of data. Many people now get their news, sports, stock, entertainment, and other information primarily from the Internet. Nevertheless, businesses have also embraced the Internet. The Internet provides the opportunity for computers to communicate instantly with other computers or individuals. Business processes that were once restricted to intranets and their users are now moving to the Internet. Accordingly, companies are moving more and more of their data to electronic forms. In addition, companies have amassed huge amounts of data in an effort to understand their business, improve performance, and build stronger employee, customer, and partner relationships.

Today, distributed computing systems are widely used by various organizations to accommodate the ever-increasing demand for the computer resources from consumers and businesses alike. In a distributed computing system, nodes (e.g., computers, processors, servers, etc.) are grouped or clustered to perform certain functions. Generally, a cluster is a collection of computer nodes that work together to perform a function, so that in many respects the cluster can be viewed as a single computer. The nodes of a cluster are usually coupled by a network, such as the Internet or an intranet. The cluster may be managed dynamically.

A dynamic cluster is a cluster system that is managed by a controller (or manager) that dynamically optimizes the performance of the cluster. Moreover, a dynamic cluster (specifically, its controller) may start and stop individual instances of application servers as required. A dynamic cluster may also dynamically balance the workloads of the nodes of the cluster based on performance information collected from cluster nodes. Consequently, dynamic clusters optimize the use of the processing capabilities of the computers in the clusters. When compared to a single computer hosting a single application server, the dynamic cluster may provide increased performance and overall lower total cost of ownership by better utilizing the existing processing capabilities of the cluster.

One example of a dynamic cluster system is provided by SAP, AG's NetWeaver Adaptive Computing infrastructure. The Adaptive Computing infrastructure enables the dynamic assignment of hardware resources to serve specific application services. In this way, SAP NetWeaver enables an Adaptive Computing infrastructure to provide business solutions based on SAP NetWeaver running at peak efficiency. In most cases, SAP's Adaptive Computing provides lower total cost of ownership by optimizing processing (e.g., better server utilization).

Virtualization technology provides another mechanism for optimizing processing. Virtualization technology provides a software layer that when executed allows multiple virtual machines with, in some cases, different operating systems to run side-by-side with other virtual machines running on the same physical machine (e.g., a node, computer, processor, server, and the like). The virtualization software provides a so-called "wrapper" that wraps and isolates the virtual machine from other virtual machines. For example, in a server complex including fifty physical servers, each of which hosts its own application server, virtualization permits the server complex to instead operate with, for example, twenty-five physical servers, each of which includes virtualization software providing two virtual machines for the application servers. In both cases, fifty application servers are deployed, but with virtualization, the number of physical servers is reduced to twenty-five.

Virtualization software may also provide one or more of the following functions: running multiple virtual machines with different operating systems at the same time on the same physical machine; generating fully configured isolated virtual machines with a set of virtual hardware including an operating system and applications; saving, copying, and provisioning of virtual machines; and moving virtual machines from one physical machine to another physical machine for workload management.

When a virtual machine is used, the virtual machine may include an operating system and one or more applications. An operating system (OS) is the program that, after being initially loaded into a computer by a boot program, manages other programs on the computer. The other programs (also referred to as application programs or programs) may use the operating system by making requests for services through one or more application program interfaces (APIs) of the operating system. An application may perform one or more specific functions (or tasks) directly for a user or, in some cases, another program or application program. Examples of applications include spreadsheets, word processing, browsers, databases, enterprise applications, and the like. For example, a virtual machine may include an operating system, such as Linux or Windows Vista, and one or more application programs, such as a browser, all of which operate in the so-called "container" provided by the virtual machine.

In some cases, the virtual machine may also include some data for use by the application. When this is the case, the virtual machine may be referred to as a virtual appliance. The phrase "virtual appliance" refers to an example of a virtual machine that may include the application, operating system, and other items (e.g., data, drivers, etc) to enable simplification of the installation and the configuration process associated with running the application. An example of a virtual appliance is the MediaWiki software that powers Wikipedia, which is available as a virtual appliance. The MediaWiki appliance contains the necessary software, including operating system, database, and MediaWiki, to run a wiki installation as a so-called "black box."

SUMMARY

The subject matter disclosed herein provides methods and apparatus, including computer program products, for optimizing business processes.

In one aspect, there is provided a computer-implemented method. The method may include receiving information representative of one or more interfaces and aspects of each of the interfaces. The interfaces may be adjustable by a business process supervisor. The business process supervisor may adjust one or more aspects of the one or more interfaces. The results of the adjustment may be received and used to determine optimum settings to the one or more interfaces. Related apparatus, systems, methods, and articles are also described.

The subject matter described herein may be implemented to realize the advantage of optimizing complex business processes.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
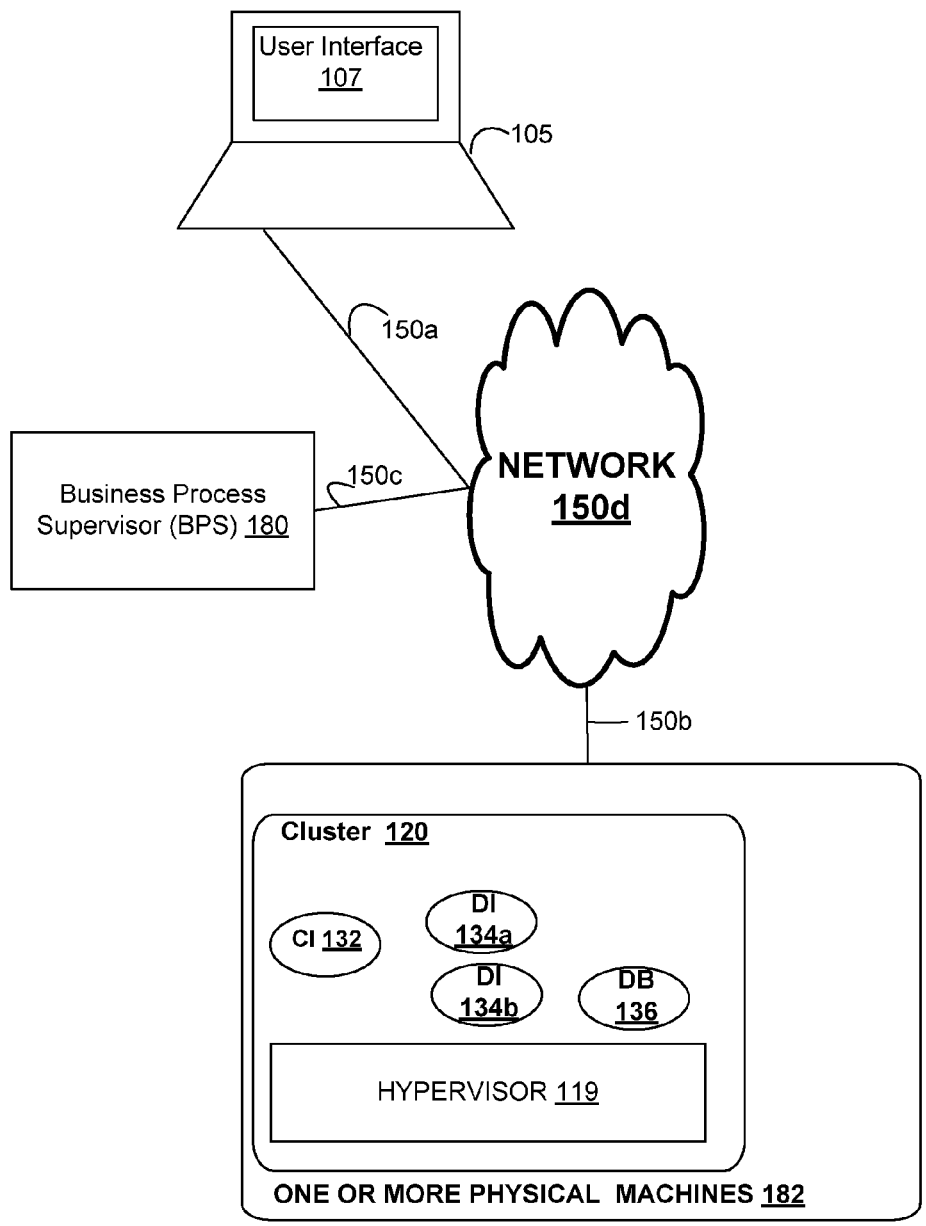
FIG. 1 depicts a system 100 including a dynamic cluster system implementing virtual machines.

Like labels are used to refer to same or similar items in the drawings.

DETAILED DESCRIPTION

More and more business processes are running in a highly dynamic environment. Dynamic elements appear at all layers of the technology stack (e.g., layers of programs of a system providing a business process).

At the so-called "lower layer," virtual machines may be used instead of physical machines. As a consequence, at any given time one or more of the following aspects of the physical machine hosting the virtual machine may be adjusted: the quantity of central processing units (CPUs), the amount of main memory, the disk capacity, and the network bandwidth (e.g., between the physical machine and a network). Moreover, these adjustments may occur at anytime including runtime and may result in adjustments to a service, such as an application being executed in the virtual machine.

At the so-called "middle layer," service containers may be adjusted by varying (e.g., increasing or decreasing) the quantity of work processes, varying the amount of main memory used by the container, varying an internal queue length, varying a size of an internal object pool, and the like. The phrase service container refers to a process that can host software components.

At the so-called "top layer," a business process may be adjusted as well. For example, adjustments may include using a service from a given web service provider rather than another web service provider. The business process refers to an overall service implemented by one or more programs.

The above layer example highlights the problem that there are literally thousands if not millions of adjustment possibilities at all of the layers of a technology stack. As such, a deterministic solution to find optimum settings resulting in peak performance is at the very least extremely difficult. The subject matter described herein relates to providing an optimized business process by finding optimum settings for one or more adjustments to the so-called technology stack. In some implementations, a stochastic optimization is used to find the optimum settings. Optimum refers a favorable outcome, when compared to one or more other outcomes. In some cases, the optimum may be the best, such as a maximum or near maximum.

FIG. 1 depicts a system 100 including various so-called layers, which may be adjusted. The system 100 includes a business process supervisor 180 and cluster 120, all of which are coupled by a communication mechanism, such as network 150a-d (e.g., the Internet, an intranet, and/or intra-process communications).

The cluster 120 includes a central instance 132, dialog instances 134a-b, and a database instance 136, all of which are implemented on a virtual machine (labeled hypervisor) 119 hosted on one or more physical machines 182, such as a server, computer, processor, blade, and the like.

The central instance 132 is an application server that controls the processes within a cluster and may include a message server for communications.

The dialog instances 134a-b are also application servers configured on the system 100. The dialog instance may be an application server providing applications, such as a customer relationship management (CRM) application, an enterprise resource planning (ERP) application, a product lifecycle management application, a supply chain management (SCM) application, a supplier relationship management application, as well as any other application. For example, when a client computer accesses an SCM application at the central instance, it is dispatched to any of the dialog instances and from then on, an instance of the SCM application runs on the physical machine on which the dialog instance runs. If another client computer accesses the central instance, the SCM application may be served from a different dialog instance or from the same dialog instance. In this example, the dialog instance operates as an application server that wraps each instance of the SCM application, so that the two SCM applications can run independently regardless of whether they run on the same or different nodes within the cluster. Moreover, these aforementioned instances represent complex applications, with many interfaces that may be adjusted. For example, the interfaces may allow adjustment to one or more of the following: may be adjusted by varying (e.g., increasing or decreasing) the quantity of work processes, varying the amount of main memory used by the container, varying an internal queue length, varying a size of an internal object pool, and the like.

System 100 also includes an instance of a database instance 136 (i.e., a database application server).

FIG. 1 depicts various so-called layers, which may be adjusted. For example, at the so-called "lower layer," hypervisor 119 may be adjusted based on changes to one or more of the following aspects of physical machine 180: the quantity of central processing units (CPUs), the amount of main memory, the disk capacity, and the network bandwidth (e.g., between the physical machine and network 150a-c). At the so-called "middle layer," application servers, such as central instance 132, dialog instances 134a-b, and database instance 136, may be adjusted to vary (e.g., increasing or decreasing) the quantity of work processes, vary the amount of main memory used by the container, vary the amount of files stored locally by an application, vary cache sizes used, vary internal queue length, and vary a size of an internal object pool, and the like. At the so-called "top layer," the system 100 may adjust which web services are used. For example, if system 100 provides Enterprise Resource Planning, web services may be selected to process purchase orders and track parts that are ordered.

Figure 2:
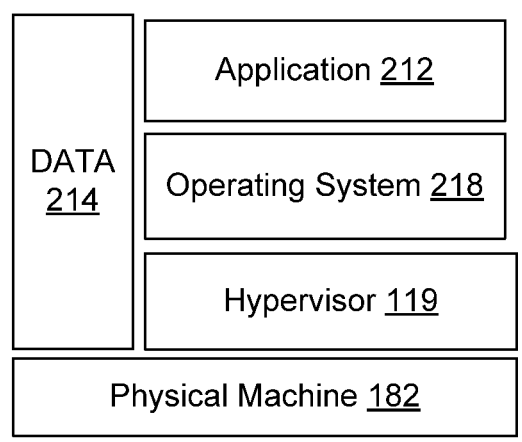
FIG. 2 depicts a block diagram of virtual machines.

FIG. 2 depicts an example implementation of a virtual machine. Referring to FIG. 2, a physical machine, such as physical machine 182, may be used to host a virtual machine, such as hypervisor 119. A hypervisor (also referred to as a virtual machine controller or, more simply, a controller) may be used to control one or more virtual machines. The hypervisor may control (or manage) the physical machine's processor, memory, and other resources enabling the virtual operating environment. VMWare ESX and VMware Server are examples of hypervisor software for virtualizing an operating environment, including IP (Internet Protocol) addresses, registries, and other aspects normally used at a computer. A hypervisor thus provides a layer of code (and/or firmware) that enables resource sharing in a virtualization technology environment. Some hypervisors run directly on the system hardware to virtualize the virtual aspects of the physical system to provide virtual machines; while other hypervisors execute as a layer on top of the operating system of the physical machine.

In some implementations, the virtual machines may be implemented as a virtual appliance, which refers to a virtual machine that includes an application, an operating system and, in some cases, data 214 to configure and/or operate the application. Moreover, the hypervisor 119 may run an application 212, such as a central instance, a dialog instance, a database instance, or any other application or application server. In some implementations, each of the applications may have an operating system 218, such as Microsoft Windows, Microsoft Vista, Java, Sun OS, Linux, or any other operating system. Although FIG. 2 depicts a single host 182, a single operating system, and a single virtual machine (e.g., a hypervisor), any number (including zero) of hosts, operating systems, and/or applications may be implemented as well.

Figure 3:
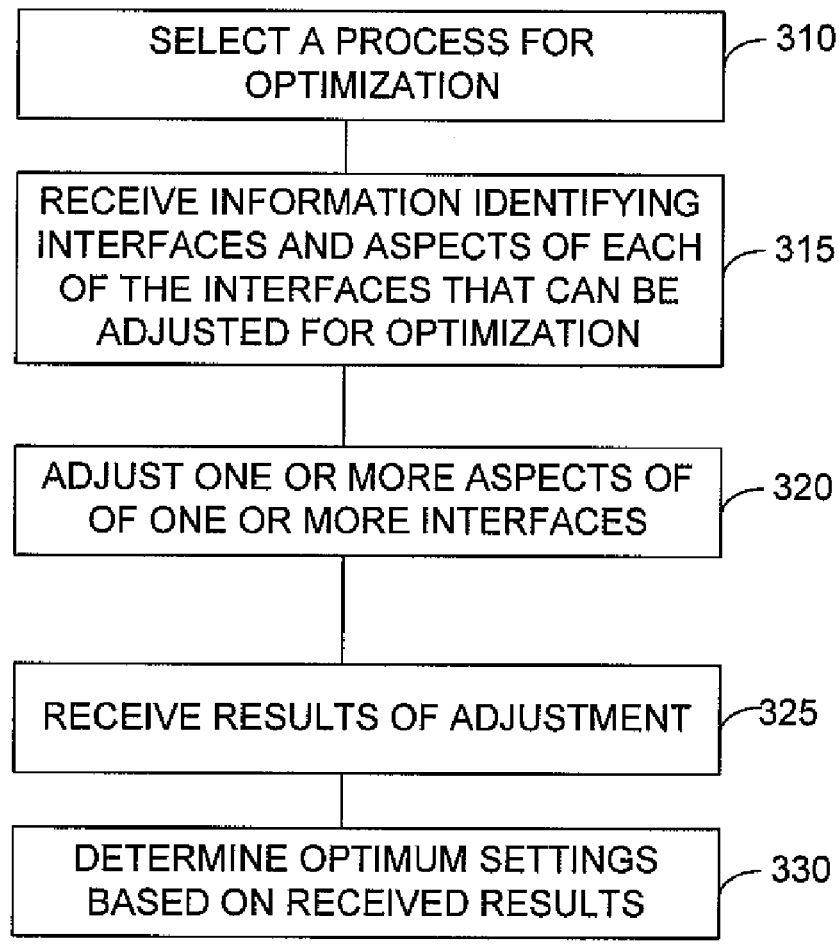
FIG. 3 depicts a process 300 for optimization.

FIG. 3 depicts a process 300 for optimizing the performance of a system, such as a business process provided by system 100. The process 300 comprises one or more of the following: selecting a process, such as a work process, for optimization (at 310); receiving information identifying interfaces and aspects of each of the interfaces that may be adjusted as part of the optimization (at 320); and adjusting one or more of the aspects of one or more interfaces (at 320). In some cases, the adjustments are based on physical limits of an interface or predefined boundaries of an interface. The adjustments may also be based on stochastic or so-called semi-stochastic adjustments. In other cases, the adjustments are based on real-time changes or, alternatively, non-real-time changes. These different types of adjustments are described further below. In any case, any results of the adjustments may be monitored, recorded, and/or received. At 325, the results of any of the adjustments are received. At 330, the results are processed to determine optimum settings. The optimum settings may then be applied to one or more of the interfaces to achieve, in some cases, enhanced operation of a business process.

At 310, a process is selected for optimization. To select a business process for optimization, user interface 107 is used to select the business process. In some implementations, one or more performance criteria may be selected by user interface 107. For example, the performance criteria may be predefined, stored at business process supervisor 180, and presented at user interface 107 for selection. Examples of performance criteria include number of transactions processed per hour, number of records changed per minute, response time per incoming request, number of documents printed per minute, etc. For example, in the case of an advanced planner and optimizer (APO), the process may perform optimization calculations within a supply chain management (SCM) system. The performance of this process is typically crucial to many companies. The performance criteria in this example would be the time used for the optimization performed by the APO and the optimization quality of the APO. The optimization quality is typically measured as a cost function (e.g., the lower the cost, the better the resulting optimization). Another example is the use of an Internet pricing and configurator (IPC), which does real-time price calculations for various good offered via the Internet. In this example, the performance criteria would be the response time a user experiences when he opens a web page and the prices are calculated in real-time (e.g., calculated while the page opens). In both examples above, there are measurement criteria. Moreover, changes to the so-called "technology stack" associated with the APO or IPC would typically have a significant impact on performance. In these and other cases, optimum settings are not known due to the complexity of the processes and the associated technology stack. The subject matter described herein determines optimum settings for these and other processes.

At 315, business process supervisor 180 receives information identifying interfaces and aspects of each of the interfaces that may be adjusted for optimization. For example, business process supervisor 180 may access a repository that includes all of the available interfaces affecting performance of the business process. In some cases, business process supervisor 180 scans system 100 for any interfaces. While in others, a system landscape directory includes available interfaces, their locations, and aspects of those interfaces capable of being adjusted.

For example, at a so-called lower layer of the technology stack, the hypervisor 119 may include an interface. The interface may be accessed to determine one or more of the following aspects: the quantity of processors at the virtual machine, the speed of processors at the virtual machine, the amount of memory at the virtual machine, the amount of network bandwidth at the virtual machine, and the amount of disk capacity at the virtual machine. Moreover, the interface may be accessed to vary these and other aspects. In some embodiments, the virtual machine includes not only the hypervisor but all technologies that are abstracted from hardware, such as Solaris zones, IBM Ipar mobility, and the like.

At the so-called middle layer, an interface may be accessed to a container (e.g., an ABAP container or a J2EE container) to vary (e.g., increase or decrease) one or more of the following: the quantity of work processes, amount of cache, the quantity of files stored locally, the amount of memory used by the container, adjustments to an internal queue length, a size of an object pool, and the like.

At the top layer, business process supervisor 180 may access an interface including a directory, such as a UDDI (Universal Description, Discovery, and Integration) listing services from different providers but with the same functionality, while in other cases the interface may provide access to an SAP Solution Manager providing a description of various business processes.

At 320, business process supervisor 180 may adjust one or more aspects of one or more of the identified interfaces. To make such adjustments, business process supervisor 180 may access the identified interfaces and apply one or more changes to the interfaces. To apply the changes to an interface, business process supervisor 180 may use the physical limit of an adjustment. For example, when an adjustment is made based on a physical limit, business process supervisor 180 may increase or decrease an adjustment at an interface until business process supervisor 180 receives an indication that further adjustment is not possible. Alternatively, predefined boundaries may be used. When predefined boundaries are used, business process supervisor 180 adjusts for each interface aspects (e.g., settings, values, parameters, and the like) between a minimum and a maximum range. With predefined boundaries, the applied changes are less likely to cause damage to a business process, when compared to the physical limit approach described above.

To adjust one or more aspects of one or more of the identified interfaces, business process supervisor 180 may also use stochastic methods (i.e., true stochastic or semi-stochastic changes). A true stochastic change refers to the business process supervisor 180 applying adjustments (e.g., settings) randomly to an interface, without regard to the relationship between different services of the business process. Business process supervisor 180 just applies some change and then receives (and/or measures) the result. However, even with a so-called random change, the same settings may not be applied twice. Semi-stochastic refers to business process supervisor 180 having some knowledge about the business process. For example, business process supervisor 180 may have information representing which services (e.g., applications) of the business process run independently of each other. When this is the case, each service can be adjusted independently. Business process supervisor 180 may make adjustments sequentially or simultaneously. The optimization may be considered complete once all services of the business process have been optimized, and business process supervisor 180 may then start another optimization with a new random setup (e.g., initial settings to vary at one or more interfaces).

To make adjustments, business process supervisor 180 may use real-time changes or non-real-time changes. Real-time changes are applied to an interface during runtime to increase the performance of a service in the business process. In this case, business process supervisor 180 may require performance metrics and a monitoring infrastructure (e.g., agents at the interface being monitored). Real-time changes may be useful if a business process does not run often over an extended period of time. For example, a business process that calculates salaries or raises may not be run as often as a business process that processes purchase orders. Non-real-time changes may be applied during a plurality of runs of a business process. Regardless, the adjustments are applied to the business process and the results are monitored either directly by business process supervisor 180, by the applications associated with the service, and/or by agents of the business process supervisor 180.

At 325, business process supervisor 180 receives the results of the adjustments. In some implementations, the result(s) of the adjustments are recorded. This process of applying adjustments to interfaces, monitoring and/or recording results, and receiving results may be repeated over a given period of time. For example, the adjustments may be applied repeatedly during a testing phase of software or it can be applied repeatedly once installed at a customer site. When applied at customer sites, data from different customers' sites may be collected to provide information to a knowledge base or knowledge repository, which can be used by business process supervisor 180 to optimize further the technology stack (e.g., the business process selected at 310). The results of optimization may be stored in an XML (eXtensible Markup Language) file that contains the name of the business process, the names of the services that are part of the business process, interfaces to the services, the underlying system infrastructure, services settings, performance metrics for a service (or an infrastructure), end-to-end processing time of the business process, and the like.

In some implementations, results from different customer sites are gathered and provided to a single knowledge base. For example, 1000 different customers may run a business process supervisor locally to analyze and optimize the business processes that matters most to them. If all the data from the different customers is collected and stored centrally, a customer site could benefit from the results of other customer sites since an optimization process could automatically apply any results. Moreover, in come cases, analyzing the processes across a plurality of customers may lead to an "optimum" result more quickly that can be applied to the customers. For example, a process at customer A may only have settings at the lower layer that are varied, while at customer B the settings at the middle layer are varied, while at customer C the settings at the top layer are varied. In this example, combining the results from different customer locations yields an optimum result that can be applied to all three customers. Moreover, the optimization may be achieve more quickly than by merely using a single customer.

At 330, business process supervisor 180 determines the optimum settings based on the results received in 325. There are two ways to apply the optimum settings—either automatically or manually. If it is done automatically, then business process supervisor 180 applies the best settings automatically to the interfaces. If it is done manually, business process supervisor 180 may send a message to user interface 107 (e.g., to alert to an administrator). User interface 107 may then be used to accept the settings, so that the interfaces may be adjusted with the settings. Regardless, optimization techniques, such as those provided by business intelligence (BI) applications may be used. For example, a BI application may use one or more of the following to determine optimum settings based on the results received in 325: linear programming, stochastic optimization, a neural network, and other numerical techniques.

By using the subject matter described herein, a user, such as a developer, may be able to determine the optimum execution environment based on a set of received data (e.g., monitored and/or measured data resulting from an adjustment at an interface). For example, a business intelligence (BI) application may be used to collect received results from 325. In this case business process supervisor 180 may access the BI application to feed the received results, trigger an optimization, and receive a response from the BI application that includes enhanced results.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed:

1. A non-transitory computer-readable medium containing instructions to configure a processor to perform a method, the method comprising:
   receiving a selection from a user at a user interface of one of a plurality of business processes for optimization by a business process supervisor;
   receiving, at the business process supervisor, information identifying one or more interfaces affecting the performance of the one of a plurality of business processes selected by the user for optimization, the one or more interfaces each having one or more aspects adjustable by the business process supervisor;
   stochastically adjusting, by the business process supervisor, at least one of the one or more aspects of the one or more interfaces to optimize performance of the selected one of the plurality of business processes, wherein the stochastically adjusting includes accessing the one or more interfaces and applying one or more adjustments randomly to the at least one of the one or more aspects of the one or more interfaces and independent of any relationship between different services of the selected one of the plurality of business processes;
   receiving one or more results at the business process supervisor from stochastically adjusting at least one of the one or more aspects;
   based on the received one or more results, the business process supervisor determining optimum settings for the one or more interfaces, wherein the optimum settings optimize the selected one of the plurality of business processes.

2. The non-transitory computer-readable medium of claim 1, wherein the stochastically adjusting further comprises:
   adjusting using one or more of the following: a stochastic change and a predefined limit.

3. The non-transitory computer-readable medium of claim 1, wherein the stochastically adjusting further comprises:
   adjusting at least one of the following: a quantity of central processing units (CPUs) used by a virtual machine, an amount of main memory used by a virtual machine, an amount of disk capacity used by the virtual machine, and an amount of network bandwidth used by the virtual machine.

4. The non-transitory computer-readable medium of claim 3, wherein the stochastically adjusting further comprises:
   adjusting by sending a message to an interface to vary the amount of main memory at the virtual machine.

5. The non-transitory computer-readable medium of claim 1, wherein at least two of the one or more interfaces are on different layers of at least one program of a system providing a business process.

6. The non-transitory computer-readable medium of claim 1, wherein the one or more interfaces are at one or more of the following levels: at a container level comprising at least one of J2EE or ABAP, at an application level, and at a business process level.

7. The non-transitory computer-readable medium of claim 1, wherein the stochastically adjusting further comprises:
   adjusting by varying a quantity of work processes at a container that is running one or more applications and adjusting a main memory that the container is using, the container comprising one of a J2EE container or an ABAP container.

8. The non-transitory computer-readable medium of claim 1, wherein the stochastically adjusting further comprises:
   adjusting by varying a quantity of main memory used, varying an internal queue length, and varying a size of an internal object pool.

9. The non-transitory computer-readable medium of claim 1, wherein the receiving the one or more results further comprises:
   monitoring the one or more results from the one or more adjustments.

* * * * *